United States Patent [19]

Boland

[11] Patent Number: 5,249,283
[45] Date of Patent: Sep. 28, 1993

[54] CACHE COHERENCY METHOD AND APPARATUS FOR A MULTIPLE PATH INTERCONNECTION NETWORK

[75] Inventor: Vernon K. Boland, Durham, N.C.

[73] Assignee: NCR Corporation, Dayton, Ohio

[21] Appl. No.: 633,732

[22] Filed: Dec. 24, 1990

[51] Int. Cl.$^5$ .................. G07F 12/00; G07F 13/00
[52] U.S. Cl. .................. 395/425; 395/325; 364/DIG. 1; 364/240.2; 364/243.4; 364/243.41; 364/243.44; 364/964; 364/964.31
[58] Field of Search ... 364/200 MS File, 900 MS File; 395/400, 425; 365/230.05, 230.03

[56] References Cited

U.S. PATENT DOCUMENTS

| | | | |
|---|---|---|---|
| 4,136,386 | 1/1979 | Annunziata et al. | 364/200 |
| 4,141,067 | 2/1979 | McLagan | 364/200 |
| 4,392,200 | 7/1983 | Arulpragasam et al. | 364/200 |
| 4,467,454 | 8/1984 | Kuroso et al. | 365/230.05 |
| 4,493,030 | 1/1985 | Barratt et al. | 364/200 |
| 4,541,076 | 9/1985 | Bowers et al. | 365/230.05 |
| 4,577,293 | 3/1986 | Matick et al. | 365/230.05 |
| 4,622,631 | 11/1986 | Frank et al. | 364/200 |
| 4,669,043 | 5/1987 | Kaplinsky | 364/200 |
| 4,695,943 | 9/1987 | Keeley et al. | 364/200 |
| 4,754,398 | 6/1988 | Pribnow | 364/200 |
| 4,783,736 | 11/1988 | Ziegler et al. | 364/200 |
| 4,825,360 | 4/1989 | Knight, Jr. | 364/200 |
| 4,833,601 | 5/1989 | Barlow et al. | 364/200 |
| 4,933,909 | 6/1990 | Cushing et al. | 365/230.05 |
| 4,939,641 | 7/1990 | Schwartz et al. | 395/425 |
| 4,975,872 | 12/1990 | Zaiki | 365/230.05 |
| 5,008,813 | 4/1991 | Crane et al. | 364/DIG. 1 |
| 5,014,247 | 5/1991 | Albachten, III et al. | 365/230.05 |
| 5,025,365 | 6/1991 | Mathur et al. | 364/200 |
| 5,058,006 | 10/1991 | Durdan et al. | 395/325 |
| 5,060,144 | 10/1991 | Sipple et al. | 364/200 |
| 5,072,369 | 12/1991 | Theus et al. | 395/425 |
| 5,091,846 | 2/1992 | Sachs et al. | 395/250 |
| 5,097,409 | 3/1992 | Schwartz et al. | 395/425 |

OTHER PUBLICATIONS

"Parallel Processing with the Perfect Shuffle," by Harold S. Stone, IEEE Transactions on Computers, vol. C-20, No. 2, Feb. 1971, pp. 153–161.

"Performance of Processor-Memory Interconnections for Multiprocessors," by Janak H. Patel, IEEE Transactions on Computers, vol. C-30, No. 10, Oct. 1981, pp. 771–780.

"Analysis of Multiprocessors with Private Cache Memories," by Janak H. Patel, IEEE Transactions on Computers, vol. C-31, No. 4, Apr. 1982, pp. 296–304.

"Effects of Cache Coherency in Multiprocessors," by Michel DuBois, IEEE Transactions on Computers, vol. C-31, No. 11, Nov. 1982, pp. 1083–1099.

"A Class of Compatible Cache Consistency Protocols and Their Support by the IEEE Futurebus" by Paul Sweazey and Alan Jay Smith, IEEE Paper, 1986, pp. 414–423.

"The Wisconsin Multicube: A New Large-Scale Cache-Coherent Multiprocessor," by James R. Goodman and Philip J. Woest, 1988 International Symposium on Computer Architecture.

*Primary Examiner*—Joseph L. Dixon
*Assistant Examiner*—Frank J. Asta
*Attorney, Agent, or Firm*—Jack R. Penrod

[57] ABSTRACT

A method and apparatus for providing coherency for cache data in a multiple processor system with the processors distributed among multiple independent data paths. The apparatus includes a set of cache monitors, sometimes called snoopers, associated with each cache memory. There are the same number of monitors as there are independent data paths. Thus, each cache stores cache tags that correspond to its currently encached data into each of the monitors of the set associated therewith. Thus, each cache has an monitor associated therewith which monitors each of the multiple paths for an operation at an address that corresponds to data stored in its cache. If such an access is detected by one of the set of monitors, the monitor notifies its cache so that appropriate action will be taken to ensure cache data coherency.

16 Claims, 7 Drawing Sheets

CACHE COHERENCY METHOD AND APPARATUS FOR A MULTIPLE PATH INTERCONNECTION NETWORK

BACKGROUND OF THE INVENTION

The present invention relates to electronic data processing (EDP) systems, and more particularly to EDP systems which have multiple processors, each processor having its own cache memory, interconnected by multiple interconnections, e.g. buses.

Cache memories were originally added to uniprocessor systems in order to increase memory access speed. Without cache memories, every memory access, either READ or WRITE, involved main memory. Typically main memory was distantly located, and also was relatively slow in operation. This meant that a number of processor cycles were required in order to access data stored at a main memory address. It was found that the number of processor cycles required for an access could be reduced by transferring the data of some main memory addresses to a cache memory that is closer to the uniprocessor and faster at READING and WRITING the data than main memory. When a transaction involving encached data is completed, the resulting data is typically stored in the cache memory again and also is eventually copied back to the corresponding address locations in main memory. For proper system operation some type of record is kept to indicate at the end of an operation whether the location for the resulting data corresponding to an address is in cache memory or in main memory.

A multiple processor system that has a cache memory associated with each of its processors has an even more complex data problem. In multiple processor systems, each cache may contain data associated with a main memory address, and each processor may process the data for that address and store the results in its respective cache. Thus, unless something in the EDP system prevents it, it is possible that many different data values will exist among the multiple caches for a single address. This possible inconsistency among corresponding address locations is referred to in the art as the cache coherency problem.

One solution to the cache coherency problem requires the main memory to record the location of each encached copy of data associated with a main memory address. When any encached copy is modified, the results are stored in the cache of the processor performing the processing, copied through to the corresponding address in main memory, and then copied to each additional cache that also has data associated with the main memory address. It is up to the EDP system to provide a cache data protocol for the processing of the data associated with each address so that each of the processors always processes current, coherent data. The copy back process works quite well for two processor systems; however, as the number of processors increases, the interconnect sub-system tends to become overloaded by the frequent copying back of information to main memory and the frequent updating of all of the encached copies of the information. In such a system, the gains in processing power provided by multiple processors may be negated by the overloading of the system interconnect by update messages to the processor caches.

One approach to preventing the cache messages from overloading and bogging down the common system interconnect is to provide a separate cache management subsystem, including a separate cache interconnect. Such a separate cache interconnect connecting to each cache memory, however, is the equivalent of a second system interconnect in speed and data requirements. So this approach adds a non-standard cache interconnect that is roughly equivalent to common system interconnect. Such a cache interconnect would require considerable software and hardware investments to upgrade existing platforms or to manufacture a completely new software and hardware platform.

A second approach to preventing the cache messages from overloading the common interconnect is to provide multiple system interconnects, e.g. multiple parallel buses to a common memory. By spreading the data traffic among multiple parallel buses, the traffic on each bus could be reduced such that the copying back, or similar operation, of resulting data would not cause an overload. However, such a system architecture may require as many parallel system buses as there are processors with caches. Since typical standard system bus architectures have one or two system buses, such architectures could not be readily extended to systems with five processors or more without incurring expensive custom hardware components and considerably more complex memory architectures.

Thus, there is an unfulfilled need for a method and apparatus for interconnecting a number of processors with a like number of caches which maintains data coherency and yet may be effectively used within existing system hardware and back plane designs.

It is an object of the present invention to provide a method and apparatus that ensures coherency of the data in each cache of a multiple bus interconnection system.

It is a further object of the present invention to provide an apparatus that ensures coherency of encached data which is extensible within existing system interconnect architectures.

SUMMARY OF THE INVENTION

According to one aspect of the invention, the foregoing objects are achieved by providing an apparatus for maintaining data coherency in a system having multiple independent paths interconnecting multiple processors, each of said processors having a respective cache memory associated with it. The apparatus includes a device for storing data from a main memory into a corresponding address of a first of the cache memories that is connected to one of the multiple independent paths and a device for storing cache tag information in each of a plurality of cache monitors associated with the first cache memory. Each of the cache monitors monitors a respective one of the multiple independent paths for any access to any of the cache memories which would render data stored in the first cache non-coherent. Each of the cache monitors has a device for transmitting a control signal to the system indicating that data stored in the first cache is non-coherent if any such access is detected on any of the multiple independent paths.

In a specific embodiment the aforementioned objects are achieved by providing, an electronic data processing apparatus which includes a plurality of processors; a plurality of caches, each of which is respectively connected to and associated with one of the plurality of processors; an interconnect network having a plurality of independent paths with the plurality of processors distributed substantially equally among the independent paths with each processor and its respective cache connecting to one of the plurality of independent paths; a main memory which is connected to each of the plurality of independent paths; and a plurality of activity monitors with each of the activity monitors uniquely connecting one of the plurality of caches to one of the plurality of independent paths. These elements operate together such that if any of the processors accesses data from its respective cache, the access signal will also be transmitted on its independent path, and the activity monitors that are connected to this independent path will each compare the address of the accessed data with addresses of information stored in each monitor's cache and each monitor will inform its respective cache if the access affects the coherency of data stored therein.

BRIEF DESCRIPTION OF THE DRAWINGS

While the specification concludes with the appended claims particularly pointing out and distinctly claiming the subject matter which is regarded as the invention, it is believed that the invention will be better understood from the following detailed description of the illustrative embodiment taken in conjunction with the accompanying drawings in which:

DETAILED DESCRIPTION OF A PREFERRED EMBODIMENT

Figure 1:
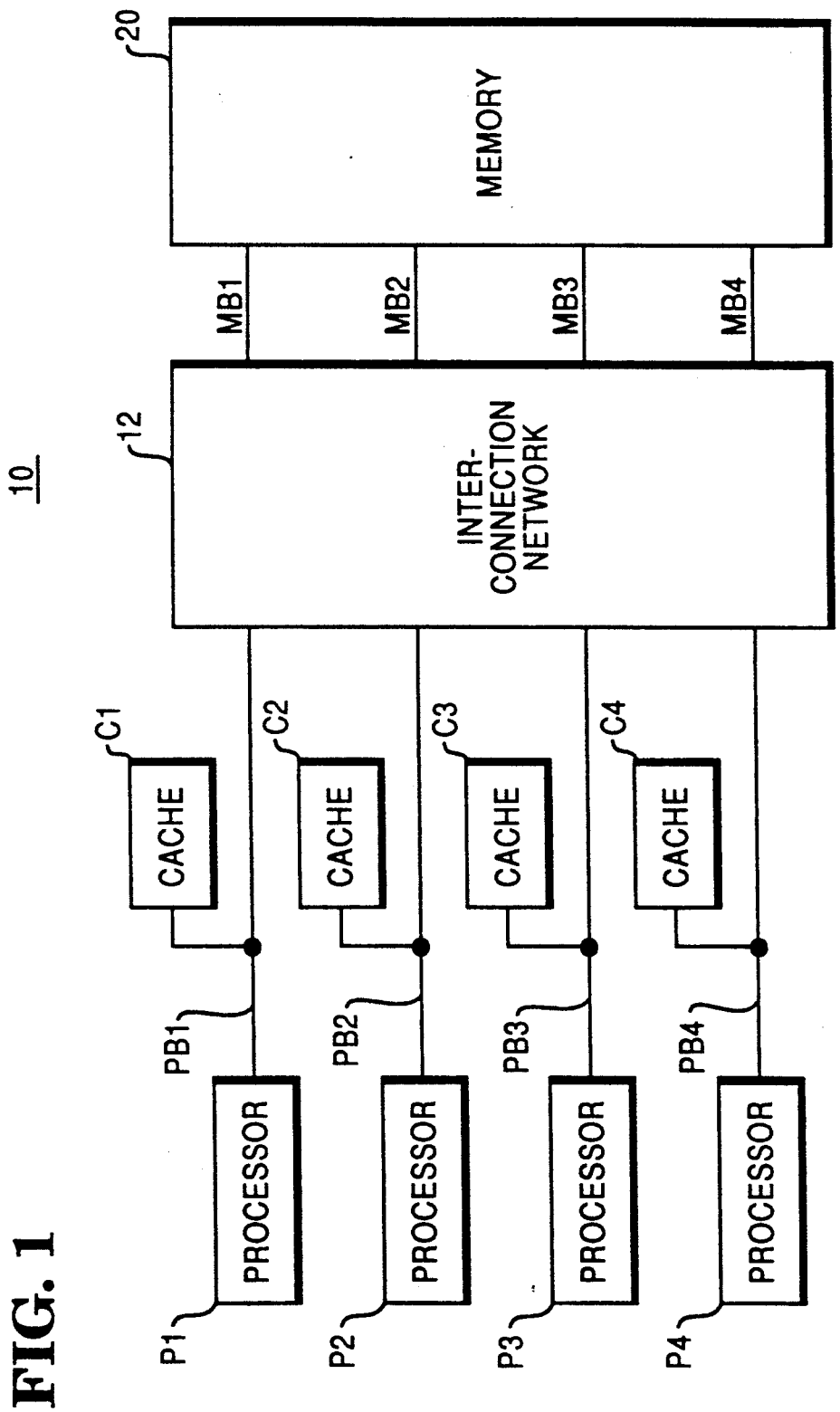
FIG. 1 is a block diagram of a typical cache system having four processors, each having a respective cache, and the processors are interconnected via a generalized interconnect system between their cache outputs and memory.

FIG. 1 is a generalized block diagram of a multiple processor system 10 which includes a generalized interconnect 12 for information and control data bits. Each of the processors P1-P4 is connected to the interconnect 12 via a respective processor bus PB1-PB4. Each processor P1-P4 is also connected via its respective processor bus PB1-PB4 to a respective cache memory C1-C4 which is associated therewith. The cache memories C1-C4 reduce the access time to addresses that are frequently used by their respective processors P1-P4 because an access to a cache is faster than a similar access from main memory segments 20.

If the interconnect 12 consists of a single path between the processors P1-P4 and memory segments 20, then the caches C1-C4 are connected via the processor buses PB1-PB4 and the interconnect 12. Connected in this manner, the caches C1-C4 can monitor all of the memory accesses directly. This assumes a typical cache operation where a processor P1-P4 initiates an access by transmitting a READ or WRITE command onto its processor bus PB1-PB4 which then propagates to the memory segments 20 and the cache memories C1-C4 other than the cache associated with the accessing processor, where the associated cache will essentially interrupt the READ or WRITE from the memory segments 20 and process the READ or WRITE itself whenever the associated cache has data corresponding to the accessed address encached therein.

A problem arises, however, if the interconnect 12 consists of multiple independent paths with some of the processors P1-P4 and their respective caches being connected to one of the paths by their processor buses PB1-PB4, and the remainder of the processors P1-P4 and their caches are connected to the remaining paths. In such an arrangement, an access to the segmented memory 20 as it propagated along its path could not be directly monitored by all of the processors and their respective caches as in the single path case. Thus, in the arrangement shown in FIG. 1 if the interconnect 12 has multiple independent paths, one processor may access and change data via its path, but a cache which is connected to a different one of the multiple paths may not be able to monitor the access, even though the access renders its encached data non-coherent.

Figure 2A:
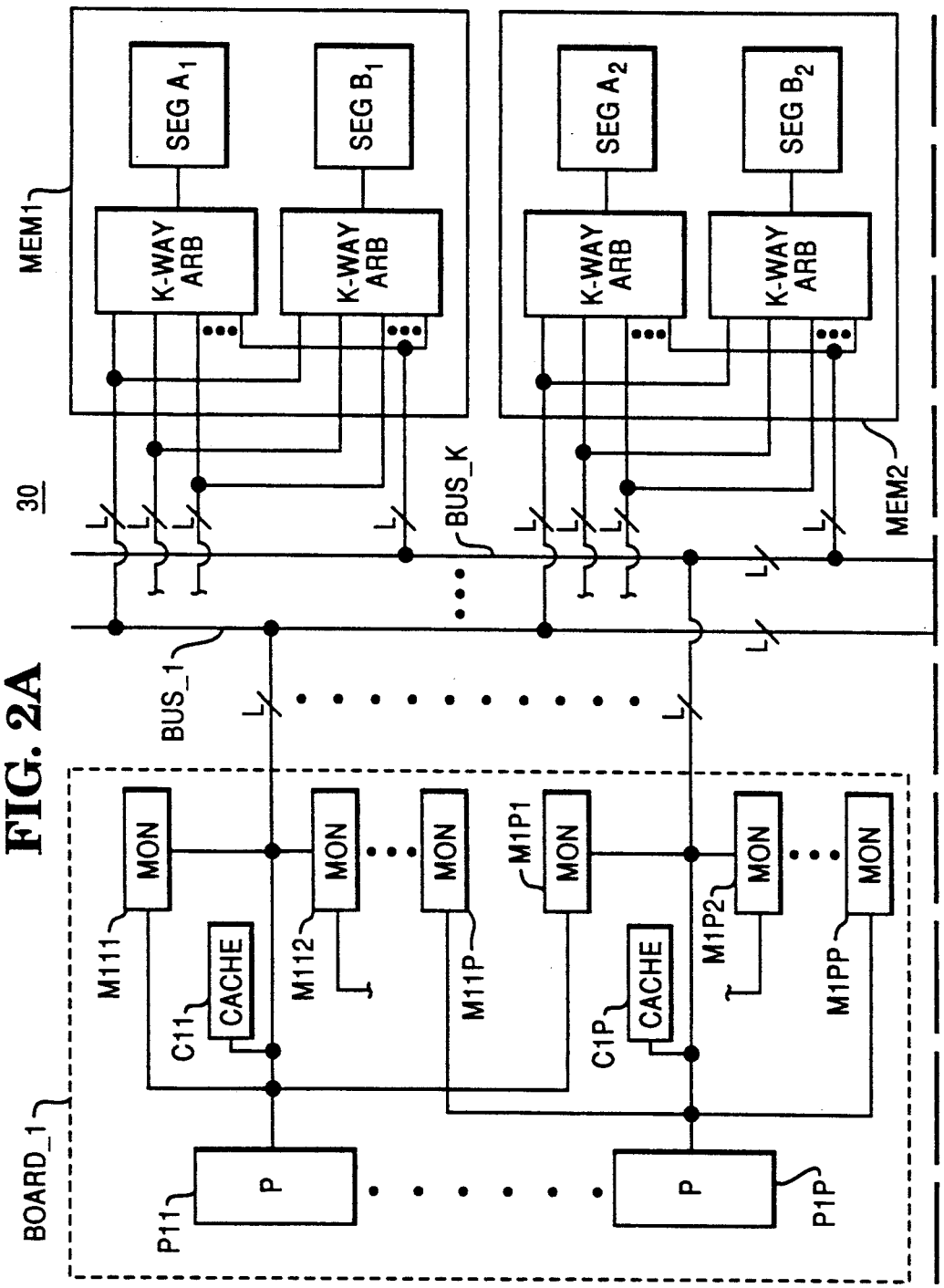
FIGS. 2A and 2B together form a block diagram of a cache coherent system according to the invention with a multiple interconnect system of multiple parallel buses interconnects multiple processors and their respective caches.
Figure 2B:
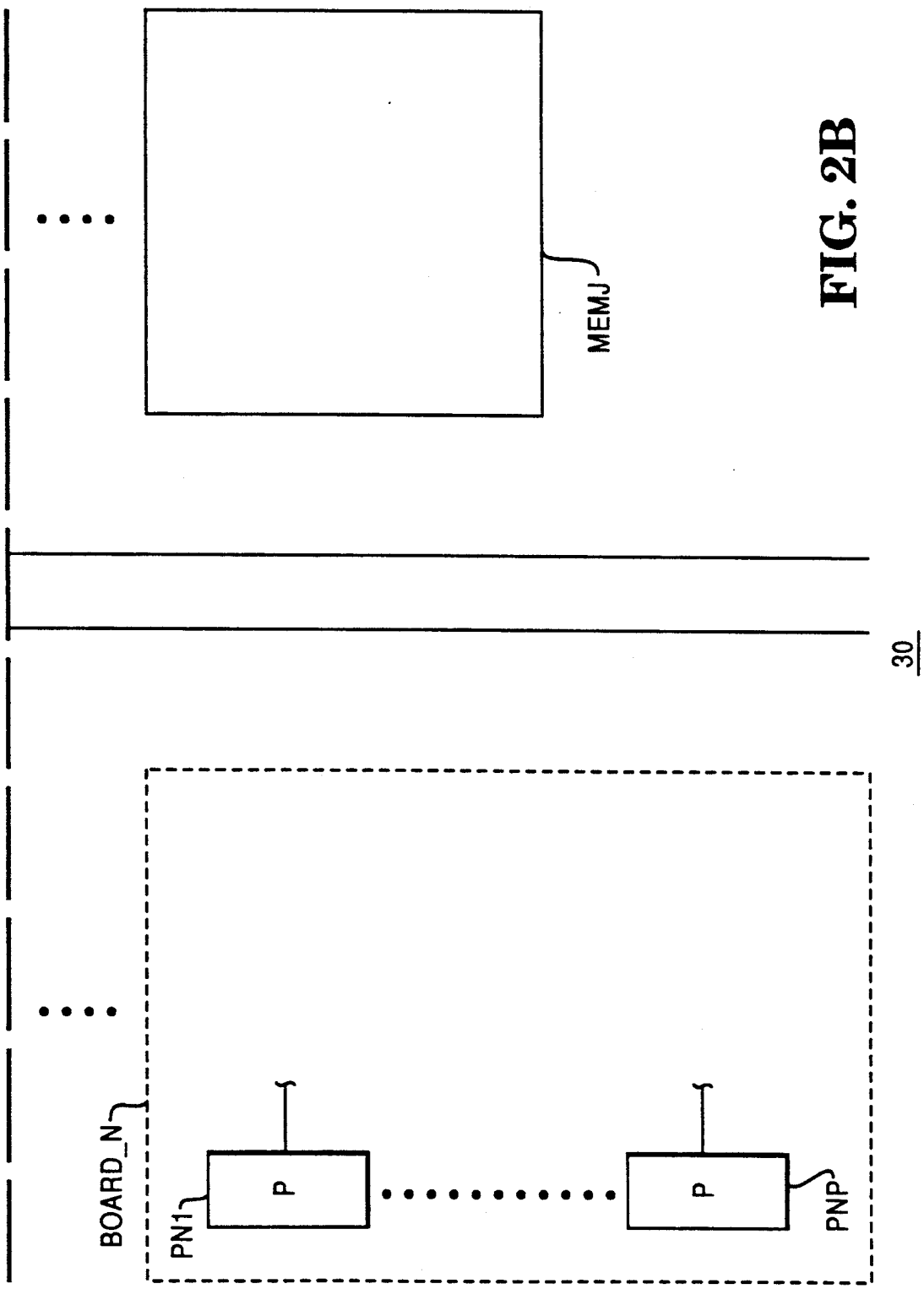

Referring now to FIGS. 2A and 2B, one embodiment of a multiple processor system 30 which prevents such data coherency problems is shown. The multiple processor system 30 includes multiple parallel buses Bus—1 through Bus—K as its interconnect network. The multiple parallel buses Bus—1-Bus—K provide K independent paths that connect multiple processors P11-PNP to memory segments Mem—1-Mem—J. The multiple processors P11-PNP are arranged on N boards Boards—1-Boards—N with P processors to a board for a total of N×P processors. Each of the multiple processors P11-PNP is connected via a respective processor bus PB11-PBNP, one per processor, to one of the multiple independent buses Bus—1-Bus—K. To the extent possible, the N×P processors and their respective N×P processor buses are connected in an equally distributed fashion to the K independent paths Bus—1-Bus—K in order to evenly distribute the data processing operations.

The system 30 has a cache memory architecture according to one embodiment of the invention. Each processor P11-PNP of the system 30 has a respective cache memory C11-CNP associated therewith which is connected to its respective processor bus PB11-PBNP. Each of the cache memories C11-CNP in the system 30 provides high speed local storage for a limited amount of frequently used control and data information. This local storage is used in addition to the lower speed, higher capacity main segmented memory Mem—1-Mem—J. The segmented memory Mem—1-Mem—J is organized in J blocks Mem—1-Mem—J. Each of the blocks Mem—1-Mem—J is divided into segment A and segment B. Those skilled in the art will recognize that with a minor modification each block Mem—1-Mem—J may be divided into more or fewer segments, and such modifications are deemed to be within the scope of the present invention. Segment A and segment B of each block are connected through respective K-way arbitrators to the independent paths Bus—1-Bus—K. With the arrangement shown in FIGS. 2A and 2B, any of the processors P11-PNP may access any address of main memory Mem—1-Mem—J, and the segmentation permits concurrent accesses to addresses in different segments in order to speed up the memory system. The main memory Mem—1-Mem—J is a global memory and could be used as a commonly accessible location for cache tag information of the individual caches in order to provide cache coherency, but as mentioned previously, such an approach requires a more complex main memory structure and tends to overload the paths Bus_1-Bus_J with cache coherency data transfers, thereby preventing the multiple processors from being used to their greatest efficiency.

In order to provide coherency among the cache memories C11-CNP for the multiple independent path system 30 without the addition of a complex main memory sub-system or an expensive, non-standard cache bus sub-system, each of the caches C11-CNP is provided with a plurality of monitors M111-MNPK. Cache C11 is associated with a set of K monitors M111-M11K, cache C12 is associated with another set of K monitors M121-M12K, and so forth for the remaining caches and monitors. Each monitor within its set of K monitors is connected to and associated with a respective path of the K independent paths Bus_1-Bus_K. These connections are actually made to the independent paths Bus_1-Bus_K via the processor buses PB11-PBNP as shown in FIGS. 2A and 2B. Further, each monitor of a set is connected to the processor bus of the cache it is associated with in order to receive information about data stored therein as explained below.

Connected in this manner, each cache C11-CNP may monitor the memory accesses made on all of the independent paths Bus_1-Bus_K of the multiple processor system 30. For example, processor P11 is connected via its processor bus PB11 to independent path Bus_1 and also to its cache C11. The cache C11 has a set of monitors M111-M11K that it is associated with. Each of the set of monitors M111-M11K is connected at one port thereof to the cache C11 via the processor bus PB11. Each of the set of monitors M111-M11K is connected at a second port thereof to one of the processor buses PB11-PB1P on Board_1 respectively. By the connections to PB11-PB1P, the second ports of monitors M111-M11K are also connected to Bus_1-Bus_K respectively. By their first ports, the monitors M111-M11K may receive information regarding the current contents stored in its associated cache C11, e.g. cache tag information. By their second ports, the monitors M111-M11K may monitor the accesses made by all of the processors P11-PNP over the paths Bus_1-Bus_K to memory Mem_1-Mem_J. Thus, the monitors M111-M11K may each compare the accesses made on their respective paths Bus_1-Bus_K to the addresses of information stored in their cache C11 and if any processor other than P11 is accessing and updating a corresponding address in another cache C12-CNP or in main memory Mem_1-Mem_J, then C11 is informed by the monitor connected to the accessing processor's bus that its encached data is now non-coherent with the current version located in another cache or in main memory. C11, upon being informed of the non-coherency of some of its data takes appropriate action, e.g. marking the data invalid, or a flushing of the noncoherent addresses followed by a copying in of coherent data for the addresses.

Figure 3:
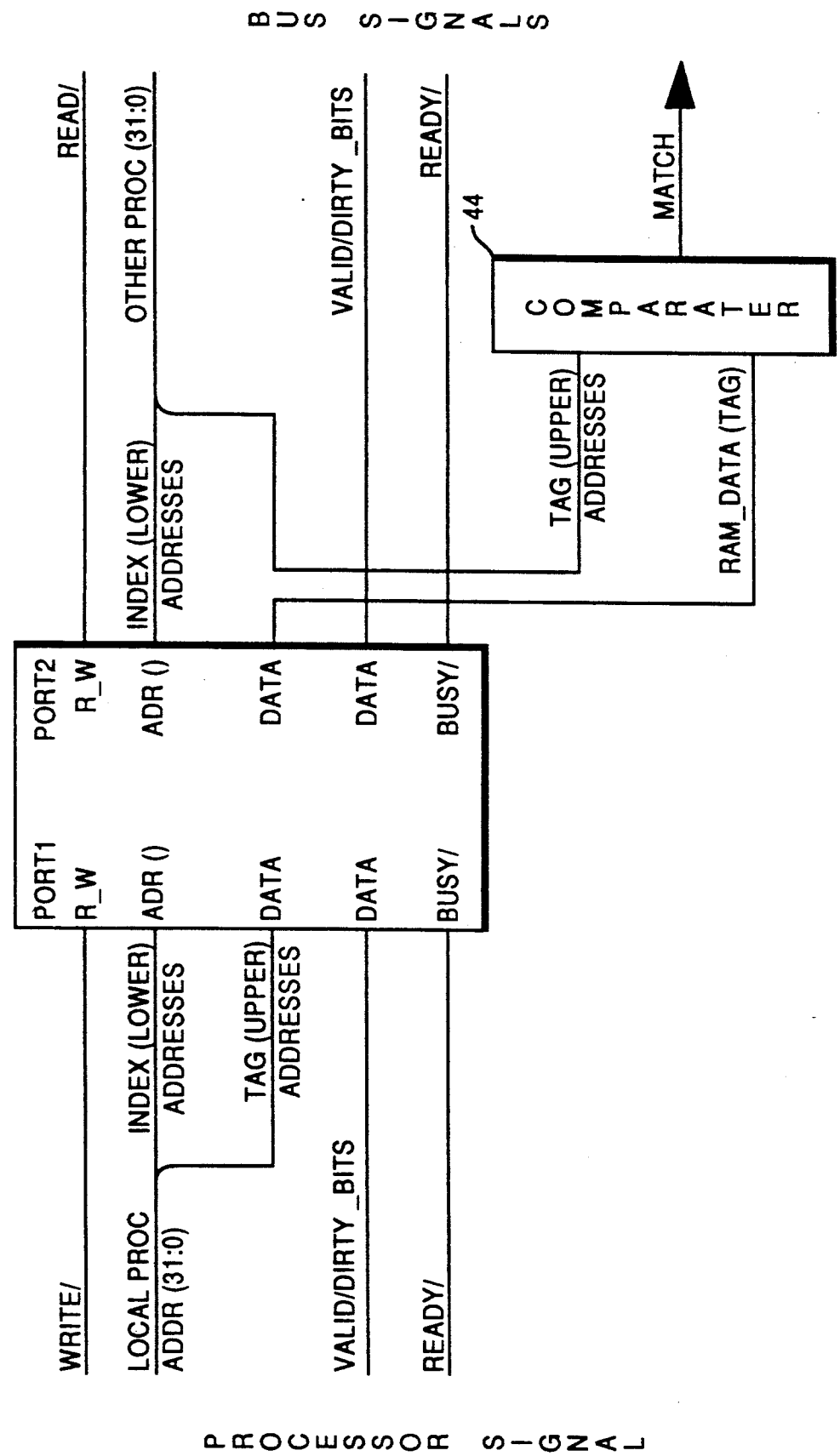
FIG. 3 is a block diagram of a monitor that is shown in FIG. 2.

Referring now to FIG. 3, the monitors M111-MNPK will be described in detail. Each of the monitors M111-MNPK has a dual port RAM 40. The dual port RAM 40 has two input/output ports PORT1, PORT2. PORT1 of each RAM 40 is connected to the processor bus PB11-PBNP of its respective cache C11-CNP and processor P11-PNP (shown in FIGS. 2A and 2B). For example, the set of monitors M111-M11K would all have PORT1 of their RAMs 40 connected to processor bus PB11 of processor P11 and cache C11. Each PORT2 of each RAM 40 of a set of monitors is connected uniquely (within its set) to one of the K independent paths Bus_1-Bus_K (shown in FIGS. 2A and 2B) via one of the processor buses on its board Board_1-Board_N. Thus, the set of K monitors M111-M11K would have the PORT2s of their RAMs 40 respectively connected to PB11-PB1K as their unique processor bus connections. The other sets of monitors M121-MNPK are analogously connected for their processors P12-PNP and caches C12-CNP.

The monitors M111-MNPK each have a comparator 44 connected at one input thereof to a data output portion of the PORT2 of RAM 40. A second input of each comparator 44 is connected to a group of tag bits from the most significant bits from the processor bus PB11-PBNP that the PORT2 is connected to.

In operation, dual port RAM 40 and comparator 44 are operated as a cache-tag circuit. For monitor M111, for example, when its processor P11 does a READ or a WRITE access with its cache C11 or main memory Mem_1-Mem_J, the processor P11 will also sends control signals to cache C11 to indicate the cache state of the current address, e.g. valid, invalid, shared, dirty, etc. depending on the protocol of the multiple processor system. The monitor M111 will be updated at the same access from P11 and it will use the same control signals to mark the cache tags stored therein so that the monitor M111 indicates the same cache state for the cache tags of cache C11 as the encached data stored in cache C11 has. If another processor P21-PN1 connected to path Bus_1 does an access, monitor M111 receives the address information on PORT2 of its RAM 40 which accesses the stored cache tag information of its cache C11. The address on PORT2 will retrieve a group of tag bits from the RAM 40 and these tag bits will be compared to the tag portion of the address on PORT2. If the comparator indicates a MATCH, this means that the access of another processor on Bus_1 has affected the coherency of part of the data encached in C11. The MATCH signal is used as a control signal to initiate action to prevent use of this non-coherent data, i.e. mark it as invalid and/or initiate a copy from a memory having a coherent copy of the data. Those skilled in the art will understand such cache operations.

In addition to the cache coherency enforcement described above, monitors M112-M11K are connected to processor P11 and cache C11 at the PORT1s of their RAMs 40, just as M111 is. Further, monitors M112-M11K are updated by processor P11 as to the addresses and state of the data encached in cache C11, just as monitor M111 is updated. But, instead of monitoring the same path Bus_1 for accesses affecting the state of the data encached in C11, M112-M11K monitor paths Bus_2-Bus_K respectively. Thus, if a processor connected to paths Bus_2-Bus_K accesses an address that corresponds to an address of data encached in C11, and that access affects the coherency of the data in cache C11 for that address, then the monitor, from the set of monitors M111-M11K, that is uniquely attached to the path over which the access is made will receive the address on PORT2 of its RAM 40. This access address on its PORT2 will retrieve a group of index bits from the RAM 40 and these index bits will be compared to the index portion of the address on PORT2. If the comparator indicates a MATCH, this means that the access of another processor on another path Bus_2-Bus_K has affected the coherency of part of the data encached in C11. This MATCH signal is then used to initiate action to prevent use of this non-coherent data, i.e. mark it as invalid and/or initiate a copy from a memory having a coherent copy of the data, in a similar manner to a MATCH generated by an access on path Bus_1 described previously.

Figure 4A:
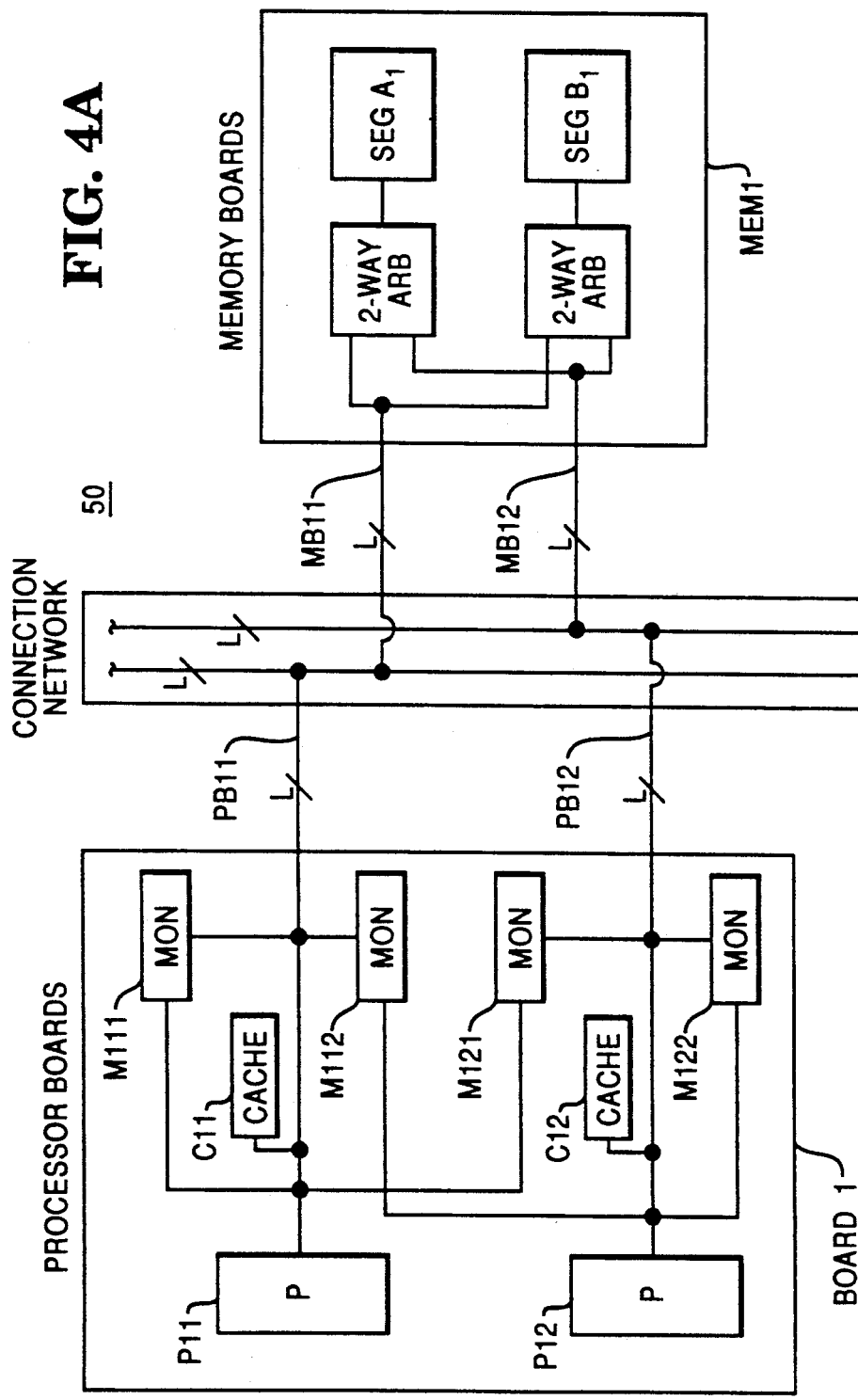
FIGS. 4, 4A, 4B, and 4C when joined together form a block diagram of a cache coherent system according to the invention with a multiple interconnect system having two parallel buses interconnecting 2N multiple processors and their 2N respective caches.
Figure 4B:
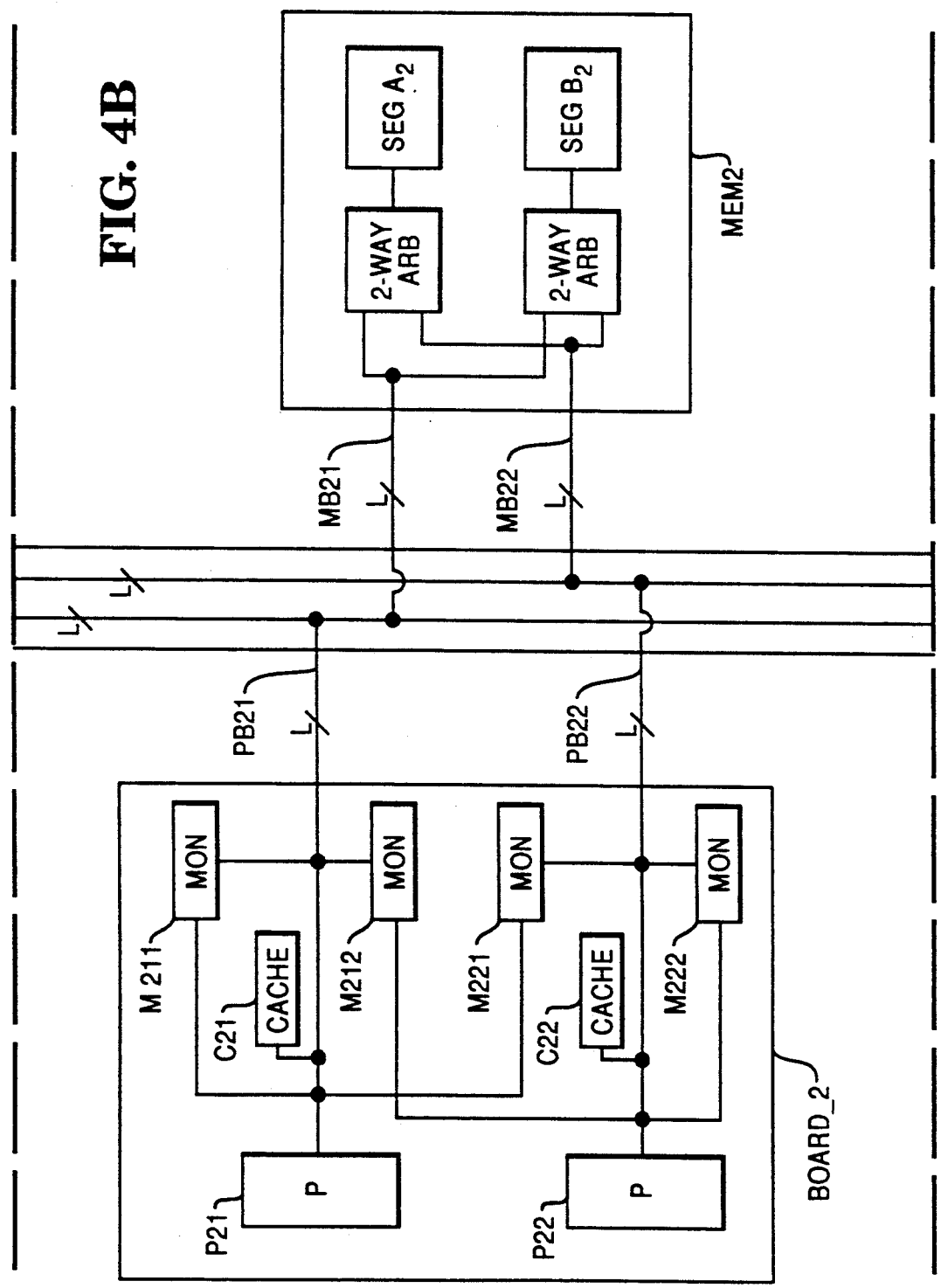
Figures 4, 4C:
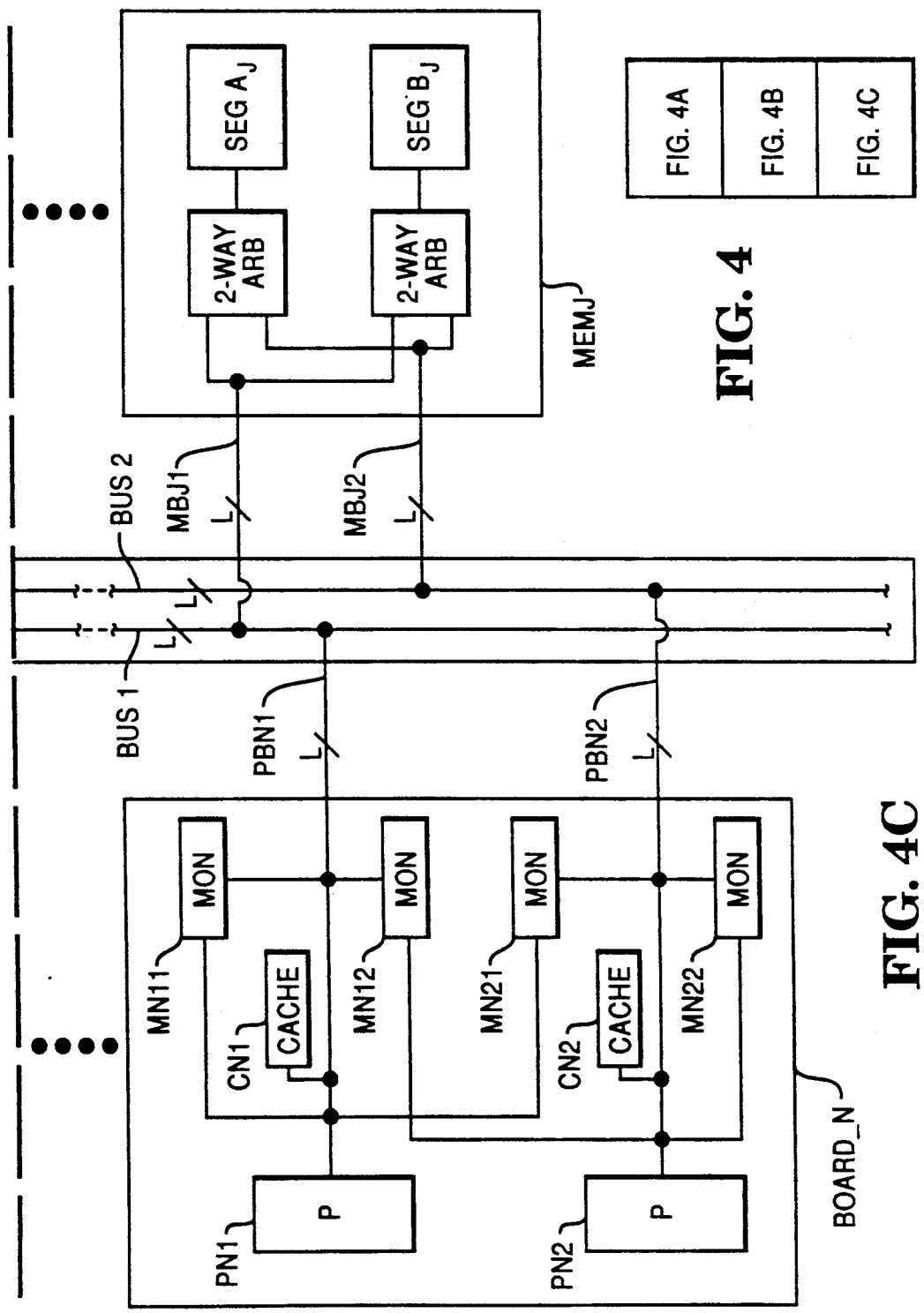

FIGS. 4A, 4B, and 4C together shows a specific embodiment of the invention described above in connection with FIGS. 2A and 2B in which K is two. This embodiment of the invention is of particular interest because systems with two parallel buses have been built, and standard hardware, i.e. the back plane and board cabinet, are readily available. For a two parallel bus system, such as the system 50 shown in FIGS. 4A, 4B, and 4C, cache monitors and their interconnections could be added at the board level, and standard back plane and cabinet level hardware of a two parallel bus system, such as a Future Bus system, could be used.

Thus, it will now be understood that there has been disclosed a cache coherency method and apparatus for a multiple path interconnection system which provides cache coherency for all caches without the addition of a cache-to-cache bus subsystem. While the invention has been particularly illustrated and described with reference to a preferred embodiment thereof, it will be understood by those skilled in the art that various changes in form, details, and applications may be made therein. It is accordingly intended that the appended claims shall cover all such changes in form, details and applications which do not depart from the true spirit and scope of the invention.

What is claimed as new and desired to be secured by Letters Patent of the United States is:

1. An apparatus for maintaining data coherency is a system having multiple independent paths interconnecting multiple processors, each of said processors having a respective cache memory associated therewith from a plurality of cache memories, each of said cache memories having data from a main memory stored into corresponding addresses thereof, comprising:

a plurality of cache monitors connected to and associated with a first cache memory of said plurality of cache memories, each of said plurality of cache monitors that are connected to and associated with said first cache memory stores cache tag information corresponding to addresses of data stored in said first cache memory;

each of said plurality of cache monitors that are connected to and associated with said first cache memory monitoring a respective independent path of said multiple independent paths for any access to said plurality of cache memories which would render data stored in said first cache memory non-coherent; and means for providing a control signal indicating that data stored in said first cache memory in non-coherent if any such access is detected on any of said multiple independent paths.

2. An electronic data processing apparatus, comprising:

a plurality of processors;

a plurality of caches, each of said plurality of caches is connected to and associated with a respective processor of said plurality of processors;

an interconnect network having a plurality of independent paths, said plurality of processors is distributed among said independent paths with each processor and its respective cache connecting to one of said plurality of independent paths;

a main memory connected to said plurality of independent paths; and a plurality of activity monitors each of said plurality of activity monitors uniquely connecting one of said plurality of caches to one of said plurality of independent paths of the interconnect network;

whereby if any of the plurality of processors performs an access to a data address from its respective cache, the access will also be transmitted on its independent path and the activity monitors that are connected to its independent path will each compare the accessed data address with address data of information stored in each activity monitor's cache and each activity monitor will inform its respective cache if the access affects data stored therein.

3. An electronic data processing apparatus, comprising:

a plurality of processors;

a plurality of caches, each of said plurality of caches is connected to and associated with a respective processor of said plurality of processors;

a plurality of interconnect buses, said plurality of processors is divided among said interconnect buses with each processor and its respective cache connecting to one of said plurality of interconnect buses;

a main memory connected to said plurality of interconnect buses, each of said plurality of processors may address any location in said main memory by the interconnect bus of the plurality of interconnect buses that it is connected to; and a plurality of activity monitors which is equal in number to a product of a number of caches times a number of interconnect buses, each of said plurality of activity monitors uniquely connects one of said plurality of caches to one of said plurality of interconnect buses;

whereby if any of the plurality of processors performs an access to a data address from its respective cache, the access will also be transmitted to the interconnect bus connected to the processor performing the data access and the activity monitors that are connected to the interconnect bus of the processor performing the data access will compare the accessed address with its stored information and inform its respective caches if the access affects data stored in its respective cache.

4. The apparatus of claim 3, wherein said main memory is divided into segments and each segment is assigned primarily to one of said plurality of interconnect buses, with a provision that any address location may be accessed via any interconnect bus.

5. The apparatus of claim 3, wherein each of the activity monitors informs its respective cache via a unique path that another processor has WRITTEN data to an address which corresponds to data in the activity monitor's cache so the activity monitor's cache is informed that its encached data is no longer coherent with respect to the address WRITTEN to.

6. The apparatus of claim 3, wherein each of the activity monitors includes a respective cache tag memory.

7. The apparatus of claim 6, wherein each cache tag memory is a dual port RAM.

8. The apparatus of claim 6, wherein each cache tag memory that has a match with its stored information causes a copy back of the accessed data into its respective cache.

9. The apparatus of claim 6, wherein each cache tag memory that has a match with its stored information causes a cache-to-cache transfer of the accessed data into its respective cache.

10. The apparatus of claim 6, wherein each cache tag memory that has a match with its stored information causes the corresponding data in its respective cache to be marked as invalid.

11. A method of maintaining data coherency in a system having multiple independent paths interconnecting multiple processors, each of said processors having a respective cache memory associated therewith, comprising the steps of:
   storing data from a main memory into a corresponding address of a first of said cache memories that is connected to one of said multiple independent paths;
   storing cache tag information in each of a plurality of cache monitors that are connected to and associated with said first cache memory;
   monitoring said multiple independent paths for any access to said cache memories that would render data stored in said first cache non-coherent; and
   transmitting a control signal to said system that data stored in said first cache is non-coherent if any such access is detected on any of said multiple independent paths.

12. The method set forth in claim 11, further comprising the step of receiving said control signal and marking data in said first cache invalid in response thereto.

13. The method set forth in claim 11, further comprising the steps of receiving said control signal and requesting a copy back of coherent data into said first cache in response thereto.

14. The method set forth in claim 11, further comprising the steps of receiving said control signal and requesting another cache memory copy coherent data to the main memory on one of said multiple independent buses and copying the coherent data from main memory to said first cache on another of said multiple independent buses.

15. The apparatus of claim 2, wherein each of said plurality of independent paths is a parallel system bus respectively.

16. The apparatus of claim 3, wherein each of said plurality of interconnect buses is a parallel system bus respectively.

* * * * *

UNITED STATES PATENT AND TRADEMARK OFFICE
CERTIFICATE OF CORRECTION

PATENT NO. : 5,249,283

DATED : September 28, 1993

INVENTOR(S) : Vernon K. Boland

It is certified that error appears in the above-identified patent and that said Letters Patent is hereby corrected as shown below:

Column 7, line 34, delete "is" and substitute "in".

Column 7, line 56, delete second occurrence "in" and substitute "is".

Column 8, line 5, after the word "monitors", insert "with"

Signed and Sealed this

Twelfth Day of July, 1994

Attest:

BRUCE LEHMAN

*Attesting Officer*     *Commissioner of Patents and Trademarks*